United States Patent [19]

Bommart

[11] 4,190,228
[45] Feb. 26, 1980

[54] MOULD FOR THE METALLOTHERMIC WELDING OF METAL ITEMS

[75] Inventor: Patrick Bommart, Rueil Malmaison, France

[73] Assignee: C. Delachaux, Gennevilliers, France

[21] Appl. No.: 922,035

[22] Filed: Jul. 5, 1978

[30] Foreign Application Priority Data

Jun. 7, 1978 [FR] France .................. 77 21158

[51] Int. Cl.² ................ B22D 19/04; B23K 23/00
[52] U.S. Cl. ........................ 249/86; 249/91; 249/205
[58] Field of Search ............. 249/86, 90, 201, 205; 264/276

[56] References Cited

U.S. PATENT DOCUMENTS

| 978,346 | 12/1910 | Yarrow | 249/90 |
| 1,168,062 | 1/1916 | Deppeler | 249/86 |
| 1,793,047 | 2/1931 | Brewitt | 249/86 |
| 2,469,062 | 5/1949 | Begtrup | 249/86 |
| 3,113,359 | 12/1963 | Burke | 249/86 |
| 3,274,650 | 9/1966 | Gelfand | 249/90 |
| 3,554,270 | 1/1971 | Gelfand | 249/90 |

Primary Examiner—Murray Tillman
Assistant Examiner—Arthur H. Koeckert
Attorney, Agent, or Firm—Parmelee, Miller, Welsh & Kratz

[57] ABSTRACT

A mould for use in a metallothermic welding process of at least two metal items together comprises at least two parts for arrangement around butts of each of the metal items to define a pouring cavity which is adapted to receive hot welding fluid. At least one of the faces of the mould, which in use will contact either a part of one of the items to be welded or another portion of the mould, defines a projection which presents sloping side towards the exterior of the pouring cavity. A strip of a compressible material which is little affected by heat is fitted on the projection in order to abut said part of one of the items or the other portion of the mould.

11 Claims, 9 Drawing Figures

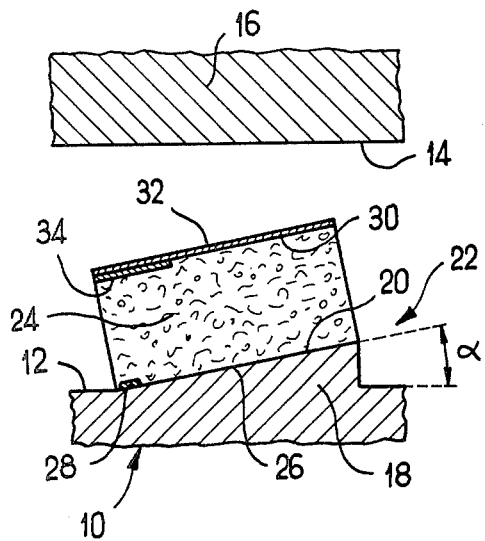
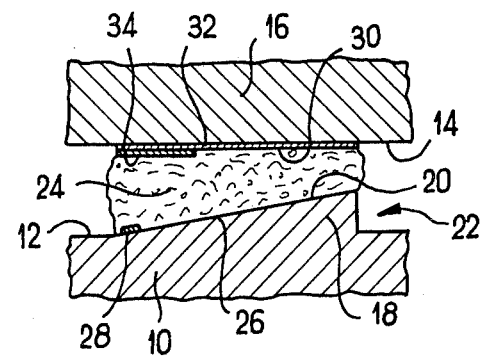
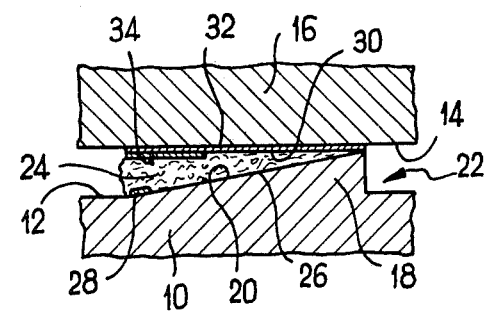
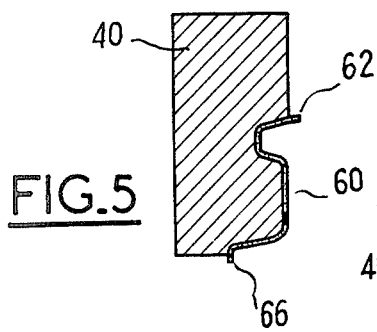
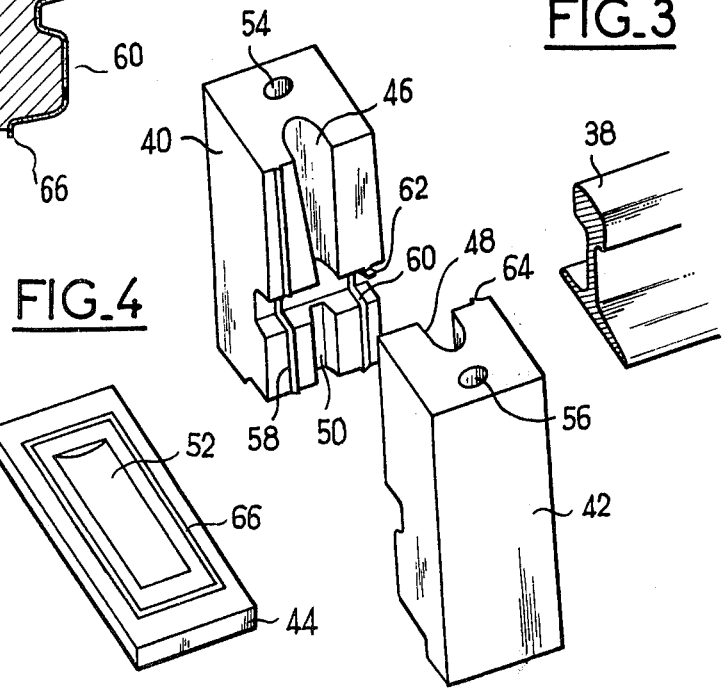
FIG.1
FIG.2
FIG.3
FIG.5
FIG.4

MOULD FOR THE METALLOTHERMIC WELDING OF METAL ITEMS

The present invention relates to a mould for the metallothermic welding of metal items and especially for aluminium thermic welding. This type of welding consists of assembling two metal parts of identical or very similar shape by running a certain amount of hot welding-fluid round the butts to be welded. To execute such welds, use is made of a mould, generally in several parts, designed to surround the parts to be welded and provided with a pouring-cavity permitting the hot welding-fluid to come into contact with the butts to be welded.

This type of weld is most often used for welding metal shapes, especially railway-lines.

In the case of aluminium thermic welding, the hot-welding fluid, which is most frequently molten steel, is obtained by the reduction of iron oxides by aluminium. Since the mould cannot be perfectly joined with the surface of the metal parts and at the surface of any other part of the mould, it is necessary to render the mould staunch before carrying out the actual welding-operation.

This staunching is carried out in classical fashion by luting with a paste sufficiently refractory not to be destroyed by contact with the hot welding-fluid. This paste which is generally composed of silica-sand and a binding agent, for example, clay and water or other additives, is put onto the mould before or after positioning and before running the hot welding-fluid.

This method of sealing gives good results, but it has the disadvantage of being long to execute and also requires to be done carefully which is not always easy to achieve on site.

It has also been proposed to replace classic-type sealing with a dry point made of a strip of asbestos or even a strip of organic material. Such joints have the drawback of giving off, when in contact with the hot welding-fluid, steam which can 'blow' the weld and thus prejudice the quality of weld obtained.

The invention aims at avoiding the aforesaid drawbacks by proposing a ready-to-use mould giving automatically the required seal as soon as positioned on the items to be welded.

According to the present invention there is provided a mould comprising at least two parts for the metallothermic welding of at least two metal items together by arrangement around butts of each of the metal items to define a pouring cavity adapted in use to receive hot welding fluid, characterised in that at least one of the faces of the mould, which in use will contact either a part of one of the items to be welded or another portion of the mould, defines a projection which presents in use a sloping side towards the exterior of the pouring cavity, a strip of a compressible material which is little affected by heat being fitted on the projection in order to abut said part of one of the items or the other portion of the mould.

The expression "little affected by heat" is intended to mean that the compressible material of which the joint is made gives off only a little or no gas when heated or by reaction with the hot welding-fluid such that this small gaseous emission does not cause 'blowing'.

A preferred material having these properties is felt of mineral origin, composed, for example, of silicates such as those of aluminium which may contain oxides of chromium, magnesium silicates, double silicates, such as sodium-iron silicates of the chrosolidite type with 3% water of crystallisation and magnesium-iron amosite-type with 3% water of crystallisation. At high temperatures such mineral felts only lose 2–5% of their weight, whereas chrysolite asbestos loses 10–20%.

Felt of these types is available on the market and may be obtained from manufacturers such as Johns Manville, FERLAM, S.E.P.R. (Societe Europeenne des Produits Refractaires). To ensure good sealing, the felt used in mould covered by the invention should have a density of about 50–200 kg/m$^3$ and preferably about 100–200 kg/m$^3$.

The strip is preferably stuck onto the projection, either by means of an organic glue or by means of a mineral glue. In the case of organic glue, a band of this is applied to a portion of the projection well towards the exterior with regard to the cavity of the mould, in such a way as to avoid the glue giving off gases into the pouring-cavity. In the case of a mineral glue, a layer of glue may be applied over the whole projection. In one particularly advantageous method of realising the invention, the face of the strip which is opposed to the face stuck onto the projection, is coated with a malleable metal foil, e.g. a sheet of aluminium. This foil is preferably stuck onto the opposed face of the strip, either by means of a layer of an organic glue applied to a portion of the opposed face which is well towards the exterior in relation to the pouring-cavity, for the same reasons as previously, that is by means of a layer of mineral glue applied to the whole face of the strip.

As a mineral glue, use may be made, for example, of a glue for foundry-cores such as "CORSY 9A" (FOSECO C°) or the "K 3" type of Societe BONIFACE.

This metal foil has the triple advantage of protecting the felt, of stiffening the joint and, thereby, allowing this to be prefabricated, and finally, of preventing the stuffing of the felt when positioning the mould, especially in portions of the items to be welded which are parallel or slightly sloped in relation to the direction of the setting of the mould upon the items, which is very important in the case of rails.

Although sealing between the various portions of the mould and the items to be welded may be effected simply by sticking joints onto projections, this invention offers in another mode of execution a mould in which the components are shaped so as to ensure staunchness between themselves, in the zone above the pouring-cavity, without requiring the use of any sealing-material.

There is no need to have recourse to any sealing-material in the zone above the pouring-cavity, i.e. in a zone where sealing is not as critical as in the zone surrounding the pouring-cavity.

This mode of execution also has the advantage of ensuring at the same time the position of the parts of the mould in relation to each other, while at the same time providing a vent for evacuation of air at the time of pouring.

To this end, the invention provides that the parts of the mould shall be provided, in the portions of the same which are in contact with each other above the pouring-cavity, with interlocking faces ensuring the location and sealing of these portions between themselves.

Preferably, each of the interlocking faces has a flat contact-face provided with a ridge and a groove which can adapt respectively to a groove and a ridge of the flat contact-face of another part of the mould. The ridge and groove of a flat contact-face are preferably arranged symmetrically in relation to a central slot opening in the flat contact-face in such a manner that two identical parts of a mould may be linked by means of the ridge of the one and the groove of the other, and conversely, the respective slots forming together a pouring-channel which can direct the hot welding-fluid into the pouring-cavity.

To ensure the sealing of the mould covered by the invention around the pouring-cavity, it is possible to combine a mode of sealing obtained by sticking joints onto the projections with a classic method of sealing by luting with refractory clay.

Although the mould covered by the invention may be used for welding any kind of metal part, one of its particularly advantageous applications is in the welding of railway-lines. The invention will now be described by way of example with reference to the accompanying drawings in which:

FIG. 1 shows a part section of a mould according to the invention and having a contact-face with a projection fitted with a seal before compression of the same;

FIG. 2 shows a view similar to that of FIG. 1 after partial compression of the joint;

FIG. 3 shows a view similar to that of FIG. 2 after total compression of the joint;

FIG. 4 shows a perspective view showing a mould in 3 parts for use in welding railway-lines;

FIG. 5 shows a cross-section of a portion of the mould shown in FIG. 4;

Figure 6:
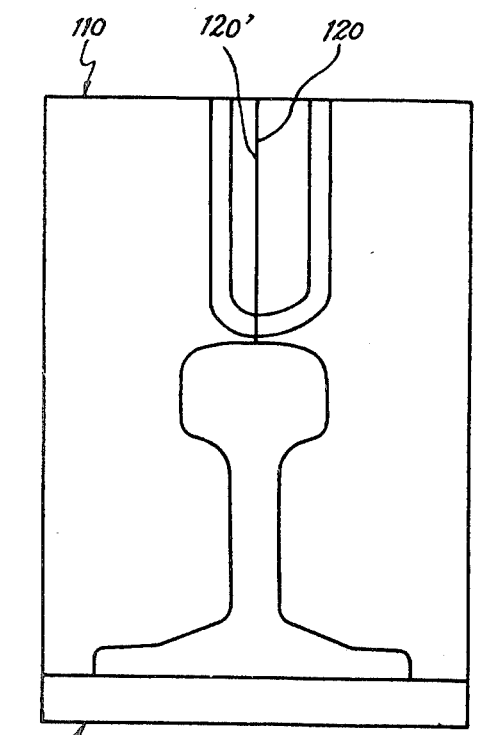
FIG. 6 is a front elevation of a three-part mould, for use in welding railway-lines, in which sealing round the pouring-cavity is ensured by interlocking faces.

In FIG. 1 there has been shown a mould 10 of which a face 12 designed to come into contact with a face 14 of a metal item to be welded or of another part of the mold as at 16 has a projection 18 which forms an integral part of the mould. This projection 18 has a side 20 inclined at an angle α with regard to face 12. The side 20 is inclined towards the outside with respect to a pouring-cavity 22 (placed to the right of the projection 18 in FIG. 1). The angle α is an acute angle which may, for example, be 10°, although this value is not a critical factor.

A strip of compressible felt 24, which is little affected by heat, is stuck onto a face 26 of the sloped side 20 of the projection 18 by means of a run of glue 28 depositioned on portion of the side 20 situated well towards the exterior with regard the cavity 22 in the mould. On a face 30 of the strip opposed to the face 26 is stuck a strip of aluminium 32, of the same width as the strip of felt, by means of a layer of glue 34 deposited well to the exterior of face 30 with regard to the pouring-cavity 22.

FIG. 2 shows the joint partly compressed after partial locking of the mould 10 adjacent the metal item or portion of the mould 16 and FIG. 3 shows the same joint fully compressed after complete locking of the mould.

By reason of the slope of the side 20 on the projection 18, the strip 24 is more fully compressed on the side nearest the pouring-cavity 22 than on the side furthest from the latter. In these circumstances, the force applied when locking acts essentially upon a very small area and thus has a considerable locking-effect. Further, the slope of side 20 of the projection 18 helps to prevent any issue of gas into the pouring cavity.

It should be noted that it is not necessary that the felt strip be fully compressed, as shown in FIG. 3, in order to ensure staundness when the mould covered by the invention is applied to items of which the shape has not the exact nominal dimensions for which the mould is designed. Indeed, certain areas of the felt strip will be strongly compressed and others less so, but, unless the shape of the items to be welded is well outside the commercial limits for shapes for which the mould is designed, these less-compressed zones will still be sufficiently compressed to ensure the seal required.

As an example, it will be noted that a 6 mm-thick felt of about 150 kg/m$^3$ is already staunch when compressed to a thickness of 2.5 mm.

The mould covered by the invention is especially advantageous when applied to the welding of railway-lines as shown in FIG. 4.

In FIG. 4 in an exploded perspective view are shown two railway-lines 36 & 38 which are to be butt-welded together by means of a pouring-mould comprising two side-portions 40 & 42, which are identical, and a sole-plate 44. The side-portions 40 & 42 are to be applied to either side of rails 36 & 38 covering the butts to be welded. The sole-plate 44 is designed to be applied under the rails 36 & 38 and under side-parts 40 & 42 of the mould. Mould-parts 40 & 42 are shaped in accordance with the rails so as to fit their shape. Mould-parts 40 & 42 have, respectively, slots 46 & 48 suited to form, once the mould-parts 40 & 42 are put together, a funnel suitable for bringing the hot welding-metal into the gap between the two rails. Slot 46 is continued by slot 50 which facilitates the penetration of the hot welding-metal to the bottom of the mould. Slot 48 in mould-part 42 is extended by a similar slot (not shown).

The sole-plate 44 comprises a hollow 52 which facilitates the penetration of the hot welding-metal under the two rails at the point of junction of the two butts. Mould-parts 40 & 42 are further provided with rising vents 54 & 56 respectively which allow the escape of the air inside the mould and this progressively with the pouring of the hot welding-metal.

The abovementioned slots in mould-parts 40 & 42 and in the sole-plate 44 make up the pouring-cavity referred to above. The seal between the various parts of the mould and the two rails is effected by means of joints as described previously with reference to FIGS. 1–3, i.e. by means of a joint made of a felt strip covered with aluminium foil and stuck onto a projection having a sloped side inclined to the exterior with regard to the pouring-cavity.

Mould-part 40 is fitted, on the face which is to come into contact with rails 36 & 38 and with mould-part 42, with joints 58 & 60 placed respectively on either side of the pouring-cavity. Joint 58 is stuck onto a projection having a side sloping toward the exterior with reference to slots 46 & 50, along the full height of the aforesaid contact-face which is shown to the left of FIG. 4. Joint 60 is stuck onto a projection having a side sloping to the exterior with regard to slot 50, along the full height of the aforesaid contact-surface, shown on the right in FIG. 4, which corresponds to the portion of the said surface which is applied to rail 38. The upper end of joint 60 ends with an extension 62 going beyond the projection to which it is stuck, the extension being, for example, 5–10 mm long, and designed to prevent any risk of leakage of welding-metal at the join between the mould-parts 40 & 42 above rail 38.

The lower ends of joints 58 & 60 finish with similar extensions (not shown) which are designed to prevent any leakage of welding-fluid at the junction of mould-part 40 with sole-plate 44. Referring more particularly to FIG. 5, joint 60 of mould-part 40 finishes at its upper end with the aforesaid extension 62 and at its lower, with an extension 66. Mould-part 42 is provided with two similar joints of which only the top end of joint 64 (which is identical to joint 58 on mould-part 40) is shown in FIG. 4. The upper ends of joints 58 & 64 have no extension since staunchness at this point of the mould is not found to be essential.

It will be noted that, on assembling mould-parts 40 & 42, the upper part of joint 64 ensures staunchness with the top of contact-face of mould 40 which is not provided with a joint and that such is also the case for joint 58 for mould-part 42.

Sole-plate 44 is provided with a sealing-joint 66 having the shape of a rectangular frame and which, for example may be realised by stamping, around the opening 52. The sealing-joint is stuck onto a rectangularly-shaped projection which has one side sloped towards the exterior by reference to opening 52. It will be clear that, according to FIG. 4, when mould-parts 40 & 42 and sole-plate 44 are pressed against each other and against both rails, the staunchness of the mould is perfect at the level of the pouring cavity.

It then suffices to feed in the hot-welding fluid by means of a crucible into the funnel formed by hollows 46 & 48. The sealing-joints for the various parts of the moulds covered by the invention will, advantageously, be positioned at the works after the fabrication of the moulds in such manner as to avoid sticking the joints in situ immediately after the welding-operation.

By acting in this fashion a fair amount of time may be saved and there will be no need to have recourse to skilled labour as required for carrying out ordinary luting.

The mould illustrated in FIG. 6 is made up of two lateral side-shells 110 & 110′ which are identical and a sole-plate 112 and is designed for use in the butt-welding of railway-lines. The half-shells 110 & 110′ are designed to be fitted on either side of the butts to be welded and their internal shape is that of a half-section of a rail. The sole-plate 112 is designed to be set under the rails and under the half-shells 110 & 110′. Sealing round the butts to be welded, about the pouring-cavity is ensured by sticking in place a sealing-joint made of a strip of compressible material, little affected by heat, as previously described.

Figure 7:
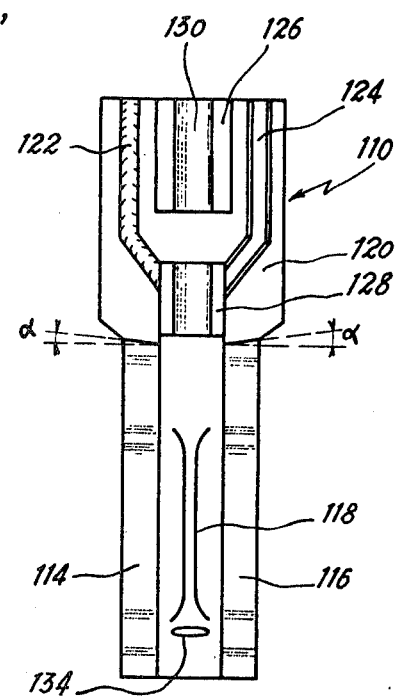
FIG. 7 is a view of the inside of a side half-shell of the mould of FIG. 6.

Thus the half-shell 110 as shown in FIG. 7 comprises, on the face which is designed to make contact with the half-shapes of the rails which are to be welded, two projections 114 & 116 set respectively on either side of a slot 118, designed to form a pouring-cavity having a hollow corresponding to 110′. Both the projections 114 & 116 each present a side sloped at α° towards the exterior in respect of the hollow 118 and are designed to be fitted with a stuck-on sealing-joint. A joint is also stuck onto the sole-plate around the pouring-cavity.

Above the pouring-cavity, that is, above the rails to be welded, the half-shells 110 and 110′ are in contact through their respective plane faces 120 & 120′ upon which there are projections which simultaneously allow the location of the half-shells 110 & 110′ and the seal between them around the surfaces 120 & 120′ which are in contact.

The form of surface 120 comprises a ridge 122 and a groove suitable to fit respectively with groove 124′ and ridge 122 corresponding to surface 120′ of half-shell 110′.

The ridge 122 and the groove 124 are placed symmetrically in respect of an opening 126 in such a way that when the two half-shells are joined, the opening 126 forms, with the opening 126′ corresponding, to the pouring-cavity through a cell formed by two hollows 128 & 128′.

This pouring-chamber may be provided with a central orifice fitted with a pouring-stopper which is removable to allow the passage of a torch if preheated welding is to be carried out. Communication between the openings 126 & 128 and 126′ and 128′ is provided respectively by bores 130 & 130′.

The ridge 122 an the groove 124 have an overall shape which is that of two linear segments forming an angle. Further, the groove 124 gives onto the opening 128 on the one hand and also onto the upper face 132 of half-shell 110. The depth of the groove 124 is greater than the height of the ridge 122 so as to allow, when the half-shells are joined, a blow-hole 132 and another 132′ (see FIG. 8) allowing air to be evacuated when the welding-metal is run.

The half-shell 110 further comprises a vertical vent comprising a cylindrical duct of maximum diameter 136 which acts as a receiver of excess welding fluid which previously heated the butts of the rails.

Figure 8:
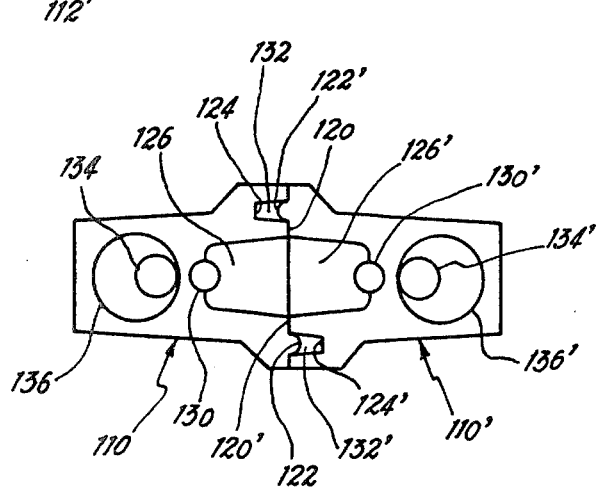
FIG. 8 is a plan view of the mould in FIG. 6.

As may be seen from FIGS. 7 & 8, half-shells are wider at the level of the surfaces in contact 120 & 120′ in order to permit better contact between the two half-shells.

Figure 9:
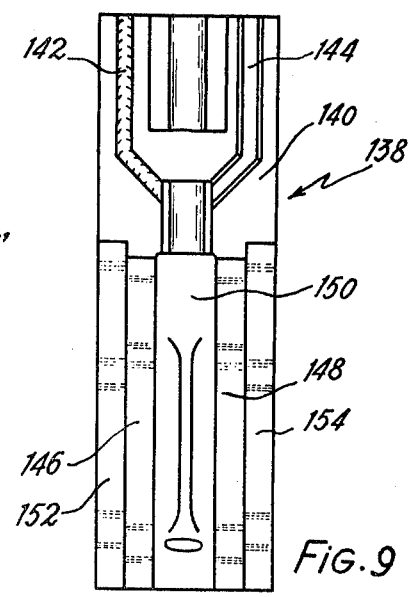
FIG. 9 is a view of a half-shell similar to FIG. 7, in which sealing round the pouring-cavity is effected by luting with a refractory-cement.

On FIG. 9 there is shown the inner face of a half-shell 138 of which the upper part is the same as that of half-shell 110 in FIG. 7 having its lower part shaped in such manner as to ensure sealing by luting. Thus, the inner face of half-shell 138 comprises a flat surface 140 provided with a ridge 142 and a groove 144 executed as above described with references to FIGS. 6–8.

Further, this inner face comprises two projections 146 & 148 set on either side of an opening 150 designed to form a pouring-cavity with an identical half-shell. Both these projections 146 & 148 have a shape which corresponds to the contour of a half-rail and are provided with throats 152 & 154 designed for applying luting-compound.

In the case of a mould comprising two half-shells of the type shown in FIG. 9, the seal between the lower part of two half-shells and the sole-plate will be effected by sticking the refractory joint onto the sole-plate.

The various parts of the mould covered by the invention are executed in the normal fashion from sand, grit and hardening material.

What is claimed is:

1. A mould comprising at least two parts for the metallothermic welding of at least two metal items together by arrangement around butts of each of the metal items to define a pouring cavity adapted in use to receive hot welding-fluid, a face of the mould which in use will contact a part of one of the items to be welded or another portion of the mould, said face having a projection limiting the mould cavity and which in use presents a sloping side towards the exterior of the pouring cavity, and a strip of a compressible material which is little affected by heat being fixedly attached to the sloping side of the projection in order to abut said part of one of the items or the other portion of the mould and thereby automatically ensuring staunching of the mould after positioning the parts thereof around butts of the metal items.

2. A mould as claimed in claim 1, in which the strip is made of mineral felt.

3. A mold as claimed in claim 2 in which the mineral felt is composed of aluminum silicates containing oxides of chromium.

4. A mould as claimed in claim 1, in which the face of the strip other than that which is fixedly attached to the projection is coated with a malleable metal foil.

5. A mold as claimed in claim 4 in which the foil is aluminum foil.

6. A mould as claimed in claim 1, in which at least one of the ends of the strip terminates with an extension which goes beyond the projection upon which the strip is fixed.

7. A mould as claimed in claim 1, in which the mould parts each comprise, in those portions which are in contact with each other and above the pouring-cavity, interlocking faces which ensure the location and staunchness of that part in respect to each other.

8. A mould as claimed in claim 7, in which each interlocking face comprises a flat contact-surface provided with a ridge and defining a groove with which a groove and ridge defined respectively on a flat surface of another portion of the mould cooperate.

9. A mould as claimed in claim 8, in which the ridge and the groove of each flat contact-surface are disposed symmetrically in relation to a central slot defined in said surface whereby the grooves and ridges of each surface cooperate one with another and the central slots cooperate to define an opening through which hot welding-fluid can introduced into the pouring cavity.

10. A mould as claimed in claim 9, in which one of the ends of each groove opens out upon the central slot and the other end of the same opens outside the mould, the depth of each groove being greater than the height of each ridge cooperable therewith so as to permit the formation, when the groove receives the corresponding ridge, of a vent for the evacuation of air when welding-fluid is poured into the pouring cavity.

11. A mould as claimed in claim 1, in which the sloping side forms an angle of approximately 10° to the contact-face of the corresponding mould part.

* * * * *

UNITED STATES PATENT OFFICE
CERTIFICATE OF CORRECTION

PATENT NO. : 4,190,228
DATED : February 26, 1980
INVENTOR(S) : Patrick Bommart

It is certified that error appears in the above-identified patent and that said Letters Patent are hereby corrected as shown below:

[30] FOREIGN APPLICATION PRIORITY DATA delete "June 7, 1978 [FR] France.....77 21158"

insert --July 8, 1977 [FR] France.....77 21158
       June 7, 1978 [FR] France.....78 17030--

Signed and Sealed this

Twenty-fourth Day of March 1981

[SEAL]

Attest:

RENE D. TEGTMEYER

Attesting Officer    Acting Commissioner of Patents and Trademarks